United States Patent [19]

Iversen et al.

[11] 4,412,581

[45] Nov. 1, 1983

[54] HEATING INSTALLATION COMPRISING A BOILER AND A HEAT PUMP

[75] Inventors: Kristian Iversen, Sønderborg; Henning Hansen, Nordborg, both of Denmark

[73] Assignee: Danfoss A/S, Nordborg, Denmark

[21] Appl. No.: 353,576

[22] Filed: Mar. 1, 1982

[30] Foreign Application Priority Data

Mar. 14, 1981 [DE] Fed. Rep. of Germany ....... 3109843

[51] Int. Cl.³ .............................................. F25B 29/00
[52] U.S. Cl. ....................................... 165/29; 62/160; 236/1 E
[58] Field of Search .................... 165/29; 62/160, 325; 236/1 E, 1 EA, 47, 46, 78 D

[56] References Cited

U.S. PATENT DOCUMENTS

| | | | |
|---|---|---|---|
| 3,627,031 | 12/1971 | Ware | 165/29 |
| 4,158,383 | 6/1979 | Rayfield | 62/160 |
| 4,332,352 | 6/1982 | Jaeger | 236/1 E |
| 4,338,791 | 7/1982 | Stamp | 62/160 |
| 4,341,345 | 7/1982 | Hammer et al. | 236/46 R |
| 4,346,755 | 8/1982 | Alley et al. | 62/160 |
| 4,353,409 | 10/1982 | Saunders | 236/1 EA |
| 4,369,765 | 1/1983 | McDaniel | 165/29 |
| 4,373,350 | 2/1983 | Noland | 165/29 |

*Primary Examiner*—Daniel J. O'Connor
*Attorney, Agent, or Firm*—Wayne B. Easton

[57] ABSTRACT

The invention relates to a heating installation which includes a boiler and a heat pump. The heat pump has a multi-stage compressor. Graded threshold value operating switches for the multi-stage compressor and the boiler are provided. A control unit which includes comparator and integrator units functions to select compressor and boiler outputs in response to comparisons between indoor and outdoor temperatures made by the comparator unit.

3 Claims, 4 Drawing Figures

Fig.1
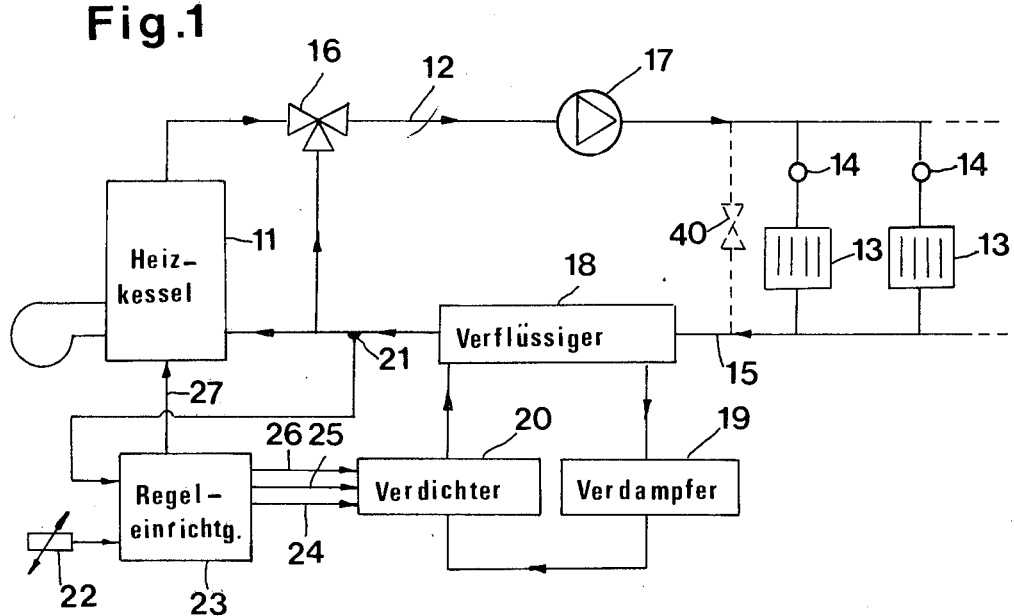
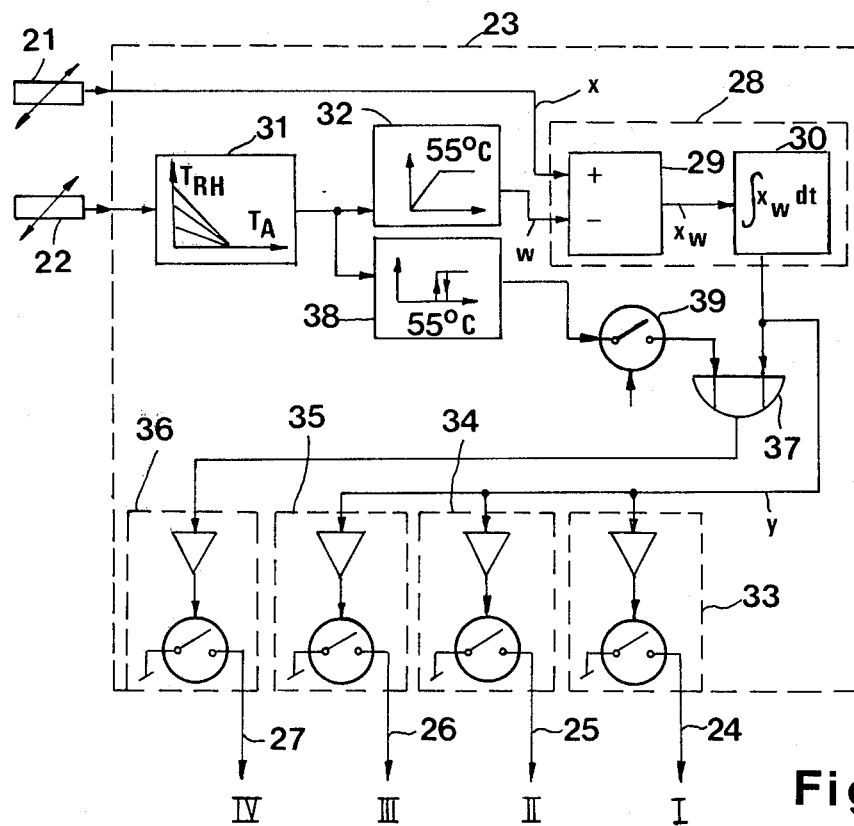
Fig.2

HEATING INSTALLATION COMPRISING A BOILER AND A HEAT PUMP

The invention relates to a heating installation comprising a boiler and a heat pump, wherein a supply line from the boiler leads to at least one radiator with a preceding temperature control valve and a return line from the radiator leads to the boiler and, by way of a mixer valve, to the supply line, the heat pump contains in a closed circuit a multi-stage compressor, a liquefier in the return line and an evaporator subjected to external heat, a return temperature sensor behind the liquefier in the return line has its output signal fed to a temperature regulating device which acts on the compressor and the boiler and also contains the outside temperature signal of an outside temperature sensor, comprises a regulator with a comparator and a desired temperature converter between the outside temperature sensor and regulator, and so regulates the heat output of the boiler and heat pump in response to the outside temperature and return temperature sensor signal that the supply temperature has a value above the desired room temperature.

In a heat pump, one endeavours to obtain as high a ratio as possible between the energy transmitted by the heat pump (from the heat source to the consumer) to the (electric) operating energy supplied to the compressor. This ratio is most favourable when the temperature difference between the heat source and the heat consumer is as small as possible. For a heat pump one therefore endeavours to keep the evaporator as hot as possible and the liquefier (condenser) as cold as possible.

In a heating installation of the aforementioned kind, the heat pump operates only from the time to time whereas the flow of water through the heating circuit remains continuous or is at least changed steplessly by the temperature control valves of the radiators depending on the amount of heat required. If the throughflow of water, which at the same time serves to cool the heat exchanger in the liquefier, is too small, a considerable temperature rise occurs in the liquefier each time the heat pump is switched on. A supply temperature sensor which is usually provided with a supply line responds to this with a delay so that a safety offswitch that is usually provided for the heat responds to an excessively high value of the pressure and temperature in the liquefier (and thus on the high pressure side of the heat pump) and switches them off. As a result, the heat pump must be frequently manually restarted because the safety off-switch has responded. To avoid this and to ensure that the regulating device automatically operates rapidly and prevents excessive heating before the safety off-switch responds, a return temperature sensor is generally provided directly behind the liquefier.

In the interest of as long a life as possible for the compressor and low losses, the compressor should operate as continuously as possible and restart as seldom as possible. The number of starts should generally not exceed 6 starts per hour. To achieve this, it is known for a timer in the regulating device to ensure that the compressor of the heat pump does not start more often per unit time as is permissible. If, for example, a compressor stage was in operation for a prolonged period and has finally reached the desired value for the desired room temperature, so that it is switched off, its restarting is prevented until a predetermined standstill period (e.g. 10 minutes) have expired, even though the actual heat demand may have called for a shorter standstill period of for example 1 to 2 minutes. If the restarting of a compressor stage is prevented on an increase in the demand for heat, the temperature can drop to such an extent during this time that the regulating device will, after expiry of the predetermined standstill period, finally start two compressor stages even though one compressor stage would have sufficed. By reason of the now excessive output of the heat pump, permanent oscillations (pendulating) with repeated switching on and off can arise with two compressor stages until the heat demand changes. Even if there are no permanent oscillations, continuous operation with as high an output as possible for the heat pump would not be attainable, i.e. long operating periods and short standstill periods (less than ten minutes).

Instead of a time control, it is also known to make the heat pump more sluggish or less sensitive by selecting as large a flow of water through the liquefier as possible. In heating installations using water as the heat carrier, this is achieved by a bypass over-pressure valve in parallel with the radiators. This valve opens when a preset pressure in the supply line is exceeded. If the heat demand drops, the radiator temperature control valves close and this throttling of the throughflow is partially companesated by the bypass valve.

Although this construction permits a substantially stable regulation of the output, it prevents the operation of the liquefier with cooling water that is as cold as possible. This is because the liquefier is practically fed with warm water. Although the supply temperature is regulated in dependence on the outside temperature and the inside temperature, it is often still too high because an accurate setting of the regulator is difficult in practice. As a result, the heat pump must be switched off because, by reason of its maximum operating temperature (about 55° C.) on the high pressure side, it is unable to increase the temperature in the liquefier (in the return line).

The invention is therefore based on the problem of providing a heating installation of the aforementioned kind which, at little a structural expense, facilitates better utilisation and a longer life of the heat pump.

According to the invention, this problem is solved in that the regulator, which is subjected only to the outside and return temperature sensor, comprises an integrator following the comparator, that a limiter between the desired temperature converter and the comparator limits the desired temperature signal to the upper operating limit of the compressor, that the output signal of the regulator is fed to threshold operating switches with different response threshold values associated with the compressor stages and the boiler, the boiler operating switch having the highest response threshold value, and that the feed water of the return line can be supplied only by way of the radiator or radiators.

This not only dispenses with a supply temperature sensor but also with a valve parallel to the radiators. Nevertheless, use of the integrator ensures a high ratio between the switching-on and switching-off periods of the heat pump and thus a low number of starts per unit time with a correspondingly longer life and lower starting energy losses. The boiler is connected only when the compressor or heat pump has to exceed the upper operating limit or the maximum available output, respectively. The limiter ensures that the heat pump can possibly permanently be operated at the upper limiting value. Depending on the outside temperature, only as many compressor stages are switched on as is necessary for maintaining the desired room temperature. Under certain circumstances, the boiler is switched off and the heat pump is operated alone. The heat pump therefore takes care of a high proportion of the heat demand required on the consumer side without the need for switching it on and off too frequently.

Preferably, a threshold value stage and a switch-on gate are provided in series between the connection from the desired temperature converter to the limiter and the threshold value operating switch of the boiler, the threshold value stage producing an output signal for switching the boiler on only when the output signal of the desired temperature converter corresponds at least to the compressor operating limit. When the switch-on gate is open and the desired temperature signal depending on the outside temperature exceeds the threshold value of the threshold value stage, the boiler remains switched on constantly and the heat pump meets the remaining heat demand.

The threshold value stage may exhibit hysteresis to prevent even small fluctuations in the outside temperature near the operating limiting value of the compressor from leading to excessively frequent switching-on and switching-off of the boiler when the switch-on gate is open.

It is also favourable if the boiler temperature below a predetermined outside temperature is set to such a high fixed value that the supply temperature will be higher than is necessary for maintaining the maximum desired temperature of the room to be heated by the installation. When switching the boiler on below this predetermined outside temperature, this leads to more intensive throttling of the temperature control valves of the radiators and thus to a smaller flow through the radiators, so that the water in the radiators will cool off more and the liquefier will be subjected to correspondingly cooler water. This leads to a further increase in the proportion of the heat demand to be met by the heat pump.

The invention and its refinements will now be described in more detail with reference to a preferred example shown in the diagrammatic drawings, wherein:

FIG. 1 is a block diagram of the heating installation;

FIG. 2 is a more detailed block diagram of the regulating device of the heating installation;

Figure 3:
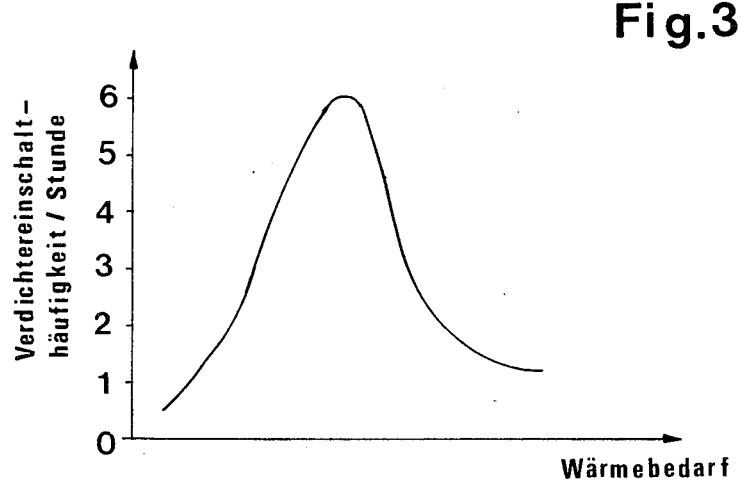
FIG. 3 is a graph showing the relationship between the compressor switch-on frequency per hour and the demand for heat in the room to be heated.

The heating installation of FIG. 1 comprises a boiler 11 which is heated by oil but could also be heated by a different fuel, e.g. gas, or electrically. A supply line 12 leads from the boiler 11 to several radiators 13 in parallel with a preceding temperature control valve 14. From the radiators 13, a return line 15 leads to the boiler 11 and, by way of a mixer valve 16, back to the supply line 12. In the supply line 12 there is a water circulating pump 17 and in the return line 15 there is the liquefier (condenser) 18 of a heat pump which also comprises an evaporator 19 and a three-stage compressor 20 in a circuit. A return temperature sensor 21 measures the temperature of the return flow directly behind the liquefier 18. The return temperature sensor 21 and an outside temperature sensor 22 both act on an electric regulating device 23 which, depending on the return flow temperature behind the liquefier and the outside temperature, switches on one or more stages of the compressor 20 and the boiler 11. With an increase in the difference between this return flow temperature and the outside temperature, the first stage is switched on by way of a line 24, the second stage by way of a line 25, the third stage by way of a line 26 and the boiler 11 by way of a line 27. The liquefier 18 contains a heat exchanger, e.g. a coiled pipe, which is disposed in the flow of return water and which is supplied with refrigerant which has been evaporated by the evaporator 19 and compressed and thereby heated by the compressor 20. The cold return water fed to the liquefier 18 from the radiators 13 extracts heat from the compressed refrigerant by way of the heat exchanger in the liquefier 18 so that the return water becomes heated and the refrigerant cools off and at the same time liquefies. The evaporator 19 is disposed in the ground or outside air and withdraws heat from its surroundings. This heat evaporates cold and liquefied refrigerant so that it can again be compressed by the compressor 20 and fed to the liquefier 18. The heat pump consisting of the elements 18, 19 and 20 is kept in operation by the regulating device 23 until the return water in the return line 15 behind the liquefier 18 has reached the desired temperature relatively to the outside temperature. If the output of the compressor 20 (at very low outside temperatures) should not sufficie for reaching the required return temperature, the regulating device 23 also switches the boiler 11 on.

According to FIG. 2, the regulating device 23 contains a regulator 28 with a comparator 29 and an integrator 30 therebehind. One input (+) of the comparator 29 is supplied with the output signal x of the return temperature sensor 21 as the existing value of the temperature to be regulated and the other input (−) of the comparator 29 is supplied with the desired value of the return flow temperature $T_{RH}$ behind the liquefier, which desired value is in the form of a signal w derived from the output signal of the outside temperature sensor 22 that represents the outside temperature $T_A$. To form the desired value signal w, a desired temperature converter 21 followed by a limiter 32 is disposed between the outside temperature sensor 22 and the outer input (−) of the comparator 29. The desired temperature converter 21 associates such a return flow temperature $T_{RH}$ to each outside temperature $T_A$ that the return temperature $T_{RH}$ increases with a drop in the outside temperature $T_A$, and vice versa. The gradient of the transmission curve of the converter 31 can be set to different values so as to adapt the converter 31 to the design of the heating installation. The limiter 32 prevents the desired return flow temperature w from exceeding an upper limit. This limit corresponds to the upper operating limit of the compressor 20, i.e. the maximum temperature attainable with the aid of the compressor 20 or the heat pump, generally 55° C., without overloading the heat pump or the compressor 20. The output signal of the regulator 28 or integrator 30 representing the set quantity y and formed by integrating the regulating departure $x_w$ is fed directly to three threshold value operating switches 33, 34 and 35 and, by way of an analogue OR linking element 37, to a fourth threshold value operating switch 36. The threshold value operating switches 33 to 35 are respectively associated with the compressor stages I, II and III and the threshold value operating switch 36 is associated with the boiler 11 which acts as a supplementary heating stage IV.

A threshold value stage 38 and a switch-on gate 39 in series are disposed between the desired temperature converter 31 with the line connecting the limiter 32 and the second input of the OR linking element 37. The threshold value stage 38 produces an output signal only when the return temperature desired value signal fed to it by the desired temperature converter 31 has a value exceeding 55° C., i.e. the limit of the compressor. It preferably has slight hysteresis to prevent small fluctuations in the outside temperature from affecting the regulating procedure. The switch-on gate 39 acts as a switch for selecting the manner of operation that can be actuated manually or automatically and is closed during colder times of the year, at least during winter.

The regulator 28 is so designed that, in conjunction with a typical heat pump, it results in a switching-on frequency for the heat pump which never exceeds six per hour. In addition, it is designed so that no pendulating occurs during a heat demand near the limit between the output of n compressor stages and n+1 compressor stages. In the illustrated embodiment, the relationship between the number of switchings-on of the compressor per hour to the load or heat demand is as shown in FIG. 3.

Figure 4:
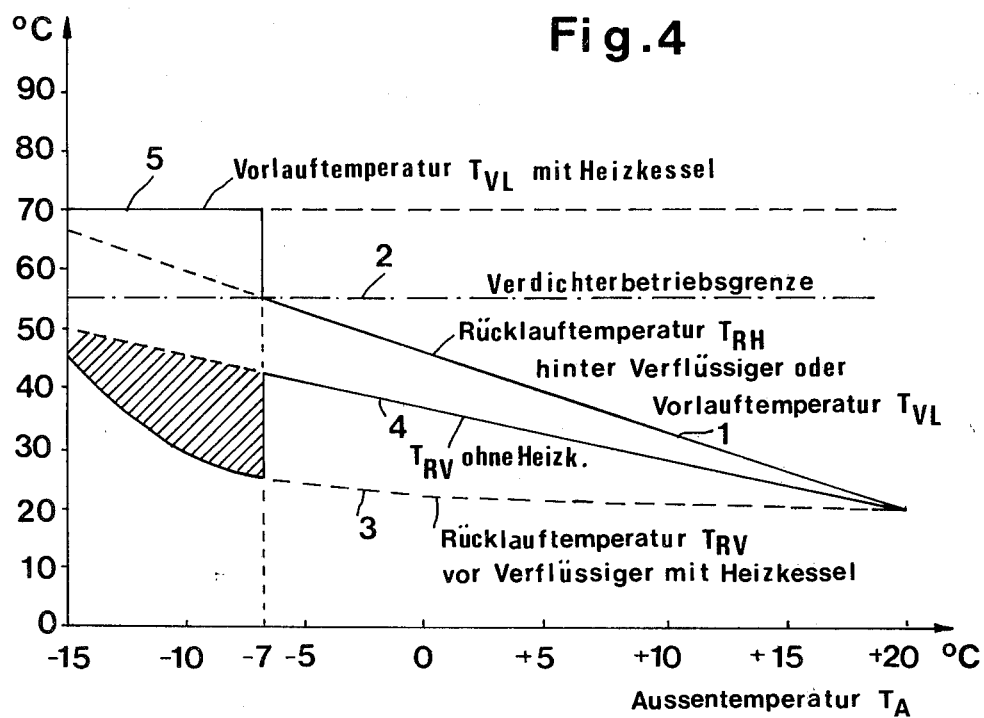
FIG. 4 is a graph showing the relationship between the supply and return temperatures of the heating installation and the outside temperature.

The function of the heating installation will now be described in more detail with reference to FIG. 4.

With an outside temperature $T_A$ (FIG. 4) higher than about $-7°$ C., it is assumed that the switching-on gate 39 is blocked so that the gate 39 will not pass a signal from the threshold value stage 38 to the threshold value operating switch 36 by way of the OR linking element 37. In this manner of operation, the compressor 20 and the boiler 11 are thus subjected only to the regulator 28. In this operating range of $T_A > -7°$ C. (in FIG. 4 to the right of the vertical shown in broken lines), the supply temperature $T_{VL}$ required to maintain the desired room temperature is assumed to be represented by the straight line 1 (set in the converter 31). This supply temperature is lower than the compressor operating limit of 55° C. represented by the straight line 2 shown in chain-dotted lines, so that this supply temperature can be achieved solely by the heat pump at an adequate output of the latter without the need for also switching on the boiler 11. The return flow temperature $T_{RH}$ measured behind the liquefier 18 can thus be equal to the supply temperature $T_{VL}$ (in the supply line 12 behind the mixer valve 16) and the regulating device 23 ensures that the heat pump normally operates alone and produces the entire required heat output. It is only when the outside temperature drops so severely that a correspondingly large control departure $x_w$ occurs for the compensation of which at a heat output for the heat pump that is too low for the pump alone even to maintain a supply temperature of 55° C. that the integrator 30 will produce such a high setting signal y that the boiler 11 will also be connected. The return flow temperature $T_{RV}$ measured in front of the liquefier 18 and represented by the curve 3 in FIG. 4 when the boiler 11 is connected lies very much under the supply temperature or the return temperature $T_{RH}$ measured behind the liquefier 18 (straight line 1 in FIG. 4), in contrast with the return temperature $T_{RV}$ without the boiler 11 (curve 4 in FIG. 4), so that the liquefier 18 is subjected to comparatively cool return water which can absorb a high amount of heat corresponding to the vertical distance between the curves 1 and 3 in FIG. 4. In a known heating installation wherein, in contrast with the installation of the invention, a bypass over-pressure valve 40 shown in broken lines in FIG. 1 is disposed parallel to the radiators 13 and their temperature control valves 14, it being possible for the warm supply water to flow through the bypass valve into the return line 15 whilst bypassing the radiators 13 when the temperature control valves 14 close upon the room temperature approaching the set desired value, the return flow temperature is always higher than in the heating installation of the invention because in the latter the flow through the radiators 13 decreases with a rise in room temperature and the water in the radiators 13 is thus more intensively cooled to maintain the room temperature at a smaller throughflow than at a higher throughflow and no warm supply water reaches the return line 15 directly. Consequently, to maintain a particular supply temperature (and thus room temperature), the heat pump is on average in operation for a longer period in relation to the boiler 11 than in the known heating installation with the bypass valve 40. With the gate 39 blocked (as is illustrated), when the outside temperature $T_A$ drops so far that the return temperature $T_{RH}$ would have to be above 55° C. to achieve the desired temperature solely by means of the heat pump, the desired value signal w is limited to 55° C. by the limiter 32. The return flow temperature $T_{RH}$ is then regulated to this value by the heat pump alone without exceeding its upper output limit whilst a higher value for the supply temperature is provided by the boiler when required. Of the compressor stages I, II and III, only so many are always switched on simultaneously corresponding to the output just required for the compressor 20 as are necessary for maintaining the predetermined desired value for the return flow temperature $T_{RH}$.

On the other hand, when the switching-on gate 39 (during colder times of the year) is open (the switch 39 is closed), the evaporator 20 and the boiler 11 continue to be subjected alone to the output signal y of the regulator 28 for as long as the outside temperature $T_A$ has not dropped so far that the desired return flow temperature w is higher than 55° C. because the threshold value stage 38 does not produce an output signal in this case. It is only when the desired return temperature signal at the input of the limiter 32 exceeds 55° C. that the threshold value stage 38 will produce an output signal which actuates the threshold value operating switch 36 by way of the (opened) gate 39 and the OR linking element 37 and thereby brings the boiler 11 into operation. The boiler is set to a constant heat output which results in a considerably higher supply temperature $T_{VL}$ according to the straight line 5 in FIG. 4 than would be necessary for maintaining the desired room temperature according to the extension of the straight line 1 shown in broken lines. In this case the limiter 32 also ensures that the operating limit of 55° C. for the compressor or heat pump will not be exceeded, i.e. the return temperature $T_{RH}$ will retain the value represented by the straight line 2 shown in chain-dotted lines. In contrast, the supply temperature $T_{VL}$ continues to rise much more than required. Accordingly, the temperature regulating valves 14 will now cause more intensive throttling of the throughflow of warm water so that the water in the radiators 13 will cool off more intensively (curve 3) than if the supply temperature were lower and the flow through the radiators 13 higher because more time for cooling is available with a smaller throughflow. The return flow water fed to the liquefier 18 is therefore also in this case comparatively cool so that the heat pump will make a relatively high contribution towards covering the entire heat demand. With an outside temperature lower than −7° C., this contribution corresponds to the spacing of the curve 3 from the straight line 2 whereas the contribution by the boiler 11 at an outside temperature less than −7° C. corresponds to the spacing between the curves 2 and 5.

The efficiency of the heat pump in the solution as described is thus better than in the known case because the temperature of the return water and thus the liquefier temperature are reduced as much as possible. The fixed temperature set for the boiler can be regulated by a boiler thermostat in a heating installation that is in any case provided as a safety against boiling over.

According to the invention, it is possible to keep the number of compressor starts low despite an unfavourable relationship between the amount of return water and the compressor output. For example, related to a period of one year, this heat pump will be in operation for far more hours than in known installations because the heat pump can now also operate in the cross-hatched zone shown in FIG. 4.

We claim:

1. A heating installation comprising a boiler, a heat pump, at least one radiator with a preceding temperature control valve, supply and return lines extending from said boiler to said radiators, a mixer valve between said supply and return lines, internal and external temperature sensors, control means for said boiler and heat pump having said sensors as inputs, said heat pump having in a closed circuit a multi-stage compressor, a condenser in said return line and an evaporator subjected to external heat, said internal temperature sensor being in said return line between said boiler and said condenser, a graded set of threshold valve operating switches for said multi-stage compresser and a threshold valve operating switch for said boiler having a higher threshold than any switch of said set of switches, temperature converter means connected to said external temperature sensor for providing an inverse signal relative thereto, limiter means connected to said temperature converter means for limiting said inverse signal thereof to the upper temperature operating limit of said compressor, comparator means having inputs connected to said internal temperature sensor and the output of said limiter means, and integrator means between said comparator means and said switches for selecting compressor and boiler outputs in response to comparisons between indoor and outdoor temperatures made by said comparator means.

2. An installation according to claim 1 characterized in that a threshold valve stage and a switch-on gate are provided in series from the junction of said temperature converter means and said limiter means to said threshold valve operating switch of said boiler, said threshold valve stage producing an output signal for switching said boiler on only when the output signal of said temperature converter means at least corresponds to said temperature operating limit of said compressor.

3. An installation according to claim 2 characterized in that said threshold valve stage exhibits hysteresis.

* * * * *